Patented Mar. 28, 1950

2,501,697

UNITED STATES PATENT OFFICE 2,501,697

DICYCLOPENTADIENE DITHIOCYANATE

Eldon E. Stahly, Pittsburgh, Pa., assignor to Koppers Company, Inc., Pittsburgh, Pa., a corporation of Delaware No Drawing. Application January 25, 1947, Serial No. 724,463

1 Claim. (Cl. 260—454)

This invention relates to methods and compositions of matter and is particularly directed to dicyclopentadiene dithiocyanate.

The novel compound of the invention may be prepared by reacting the dicyclopentadiene with nascent thiocyanogen as obtained, for example, by the action of copper sulfate on sodium thiocyanate. By this reaction two thiocyanate groups are added to the dicyclopentadiene to form dicyclopentadiene dithiocyanate.

The invention may be more fully understood by reference to the following example in which the parts are by weight unless otherwise specified, and are in the C. G. S. system.

*Example.—Dicyclopentadiene dithiocyanate*

33 parts of dicyclopentadiene (purified to a white solid melting at 27°–28° C.) was placed in a reactor. To this was added 400 volume parts of 95% alcohol (ethanol) and 283.5 parts of sodium thiocyanate. The mixture was stirred well and warmed to 40° C. Heating was then discontinued, but stirring was continued while adding dropwise a solution of 375 parts of copper sulphate pentahydrate in 750 volume parts of water. The copper sulphate solution was at 60° C. at start of addition and at about 40° C. at end of addition. The temperature of the reaction mixture increased from an initial 40° C. to 55° C. during the course of the reaction. The initial dark brown color changed to yellow as cuprous thiocyanate was formed. After the addition of copper sulphate solution was complete, stirring was continued for twenty minutes, 500 volume parts of benzene was added and vigorous agitation was continued for ten minutes more.

The final mixture consisted of an upper benzene solution containing the desired product, an aqueous-alcohol layer containing excess sodium thiocyanate, sodium sulphate and solid copper thiocyanate, perthiocyanic acid, etc. The mixture was filtered and the benzene layer separated from the filtrate. The solid residue of the filter was recombined with the aqueous filtrate and agitated with a second 500 volumes of benzene. After filtration, the benzene layer of the filtrate was separated and added to the first benzene solution. The combined benzene layers were washed with 200 volume parts of a 10% sodium carbonate solution, filtered, separated from the wash water and evaporated in vacuo to a constant volume (24 hours.) A yield of 45 grams of dark thick oil remained. Its analysis showed about 93% purity for a dithiocyanate derivative of dicyclopentadiene.

The oil polymerizes on aging to a dark solid.

The compound of the invention is useful as active ingredient in insecticidal and pharamaceutical compositions, as intermediate for the preparation of disulphide and as intermediate for the preparation of disulphonic acid.

I claim:

Dicyclopentadiene dithiocyanate.

ELDON E. STAHLY.

REFERENCES CITED

The following references are of record in the file of this patent:

UNITED STATES PATENTS

| Number | Name | Date |
|---|---|---|
| 1,790,097 | Kaufmann | Jan. 27, 1931 |
| 2,188,495 | Borglin | Jan. 30, 1940 |
| 2,286,222 | Moyle et al. | June 16, 1942 |
| 2,342,448 | Bousquet | Feb. 22, 1944 |
| 2,395,455 | Bruson | Feb. 26, 1946 |

FOREIGN PATENTS

| Number | Country | Date |
|---|---|---|
| 579,818 | Germany | July 3, 1933 |

OTHER REFERENCES

Dermer et al.: "Jour. Am. Chem. Soc.," vol. 61 (1939), p 750.